Nov. 20, 1928.
C. SPAETH
1,692,058
GREASE GUN FILLER
Filed Nov. 12, 1925
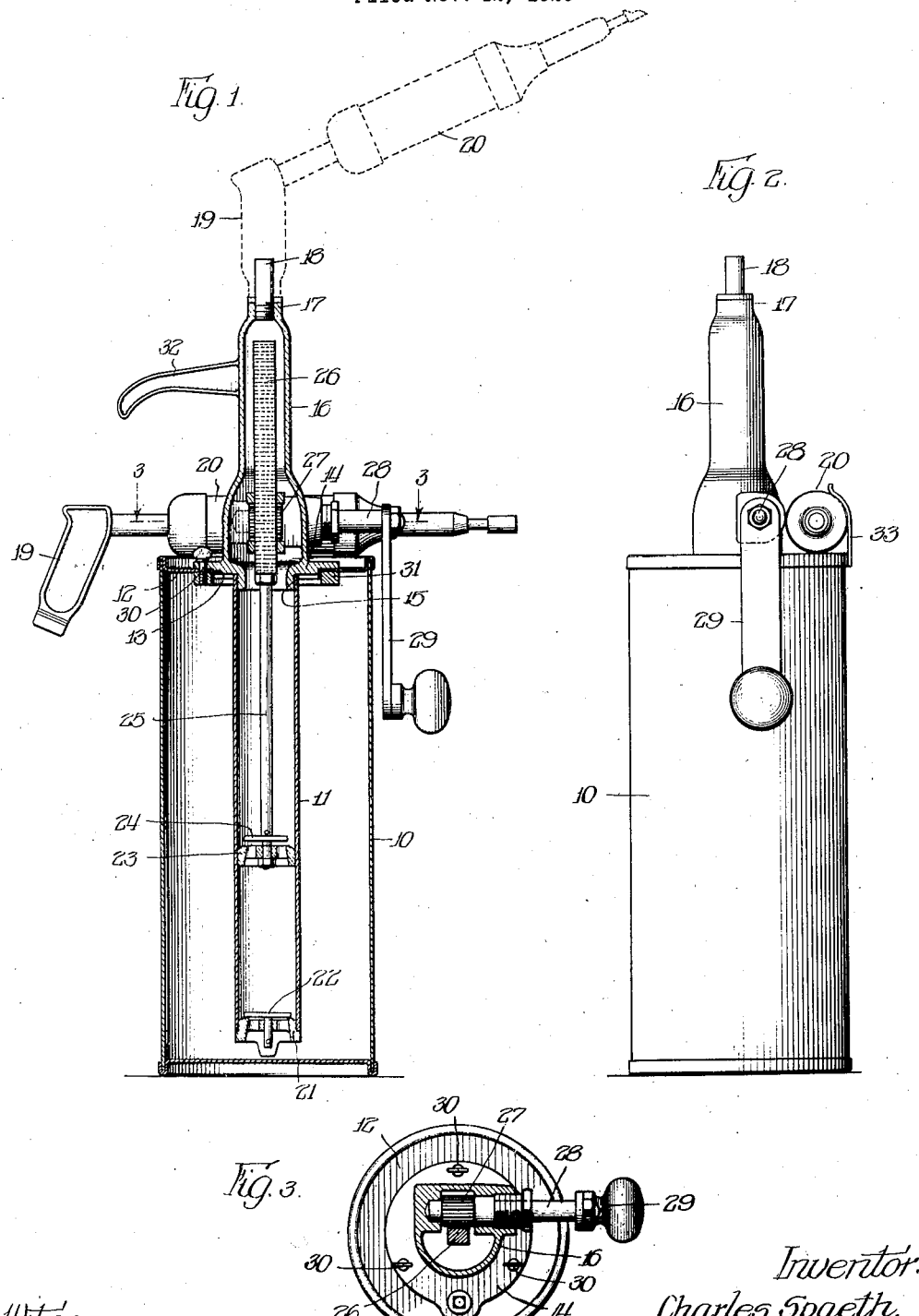
Inventor:
Charles Spaeth, Patented Nov. 20, 1928.

1,692,058

UNITED STATES PATENT OFFICE.

CHARLES SPAETH, OF CLEVELAND, OHIO, ASSIGNOR TO THE MARVEL EQUIPMENT COMPANY, OF CLEVELAND, OHIO, A CORPORATION OF OHIO.

GREASE-GUN FILLER.

Application filed November 12, 1925. Serial No. 68,494.

This invention relates to grease gun fillers.

One object of the invention is to provide a simple and efficient grease gun filler by means of which a grease gun may be easily and quickly filled from a grease containing receptacle.

Another object is to provide a grease gun filler in which the various parts are arranged and cooperate to quickly fill a grease gun and adapted to meet all of the commercial requirements.

These and other objects are accomplished by means of the arrangement disclosed on the accompanying sheet of drawings, in which—

Figure 1 is a vertical sectional view of a grease gun filler, the grease gun in full lines being shown mounted on the top of the filler and in dotted lines being shown in a position in which it is to be filled with grease from the container;

Figure 2 is a side elevation of the same grease gun filler; and

Figure 3 is a sectional view taken in the plane of line 3—3 of Figure 1.

The various novel features of the invention will be apparent from the following description and drawings, and will be particularly pointed out in the appended claims.

Referring to the figures of the drawings, it will be noted that the grease gun filler includes a grease container 10 which in this particular instance is a cylindrical container into which the cylinder 11 of a pump extends. A cover 12 is secured to the top of the container 10 and is provided with a central aperture 13, which aperture normally will be closed by any suitable cover when the pump and discharge portions, to be referred to later, are not connected to the container 10. As shown, however, there is applied and secured to the top 12 of the grease container 10 a cover member 14 having a lower threaded tubular portion 15 to which the upper end of the pump cylinder 11 is secured. This lower threaded tubular portion 15 is in open communication with the upper end of the pump cylinder 11 so that grease being forced from the cylinder 11 will pass upwardly through a fluid conducting portion 16 of the cover 14, which fluid conducting portion terminates in a nozzle 17 having a seat which preferably is provided with a nipple 18. The nipple receives any suitable gun portion for filling the gun, such as a high pressure gun used for greasing parts of automobiles.

In this particular instance, the hollow handle portion 19 of a high pressure gun 20 is passed over the nipple 18 preparatory to receiving a charge of grease. The gun handle may then be forced down on the seat and held in a position such that no grease will leak between the handle and the seat during charging of the gun.

In connection with filling a grease gun, it will be noted that the lower end of the pump cylinder 11 is provided with a ported bottom 21 having a valve 22, there being a ported piston 23 operable in the cylinder 11 having an associated valve 24. The piston is provided with an actuating rod 25 which terminates in a rack 26 which is operable in the grease conducting portion 16 of the cover member 14. Meshing with and actuating the rack 26 is a pinion 27 mounted upon a suitably journaled shaft 28 having an actuating crank 29.

It will be appreciated, therefore, that when the crank 29 is actuated the piston 23 will be given up and down movements for discharging grease through the nipple 18 into the high pressure gun 20. When the piston 23 is moved upwardly in the pump cylinder 11, it will force grease above it out through the nipple 18 and also draw grease into the pump cyclinder 11 through the ported bottom 21. On the down stroke of the piston 23, grease in the cylinder will be forced through the ported piston 23 preparatory to the next up grease discharging movement of the piston.

In this way, a high pressure grease gun may be easily and quickly filled and at the same time, it may be done neatly without wasting or spreading grease. Preferably, the cover portion 14 is removably secured to the top 12 of the container 10 by thumb screws 30 which cooperate with the ring 31 at the under side of the top 12. When it is desired to change the pump from an empty container 10 to a full container, it will simply be necessary to operate the thumb screws 30 and lift the pump as a whole out of the container 10 by use of the handle 32 which is secured to or formed integrally with the grease conducting portion 16 of the pump unit. Also, the handle 32 may be used for moving the entire unit as shown in Figure 1 from one place to another. The high pressure gun when not in use may be releasably clamped on the cover 12 of the container by use of a spring or springs 33.

By means of the arrangement hereinabove shown and described, the objects of this invention are accomplished.

I claim:

1. In a grease gun filler, the combination of a grease container, a pump cylinder mounted therein, a cover for said container connected to said cylinder and having a grease conducting portion terminating at its upper end in a substantially vertical discharge nozzle adapted for connection to a grease gun for filling purposes, a piston in said cylinder, and means for operating said piston to cause said piston to discharge grease to the gun.

2. In a device of the character described, the combination of a container, a pump cylinder mounted therein, a top secured to said container and having a central opening therein, a cover secured to said top and having a conducting member secured to said cylinder, said conducting member terminating at the top in a centrally arranged discharge nozzle and seat said nozzle projecting substantially vertically so that a lubricating gun may be connected and seated by downward pressure for filling purposes, and means in the cylinder for discharging lubricant to the gun.

3. In a device of the character described, the combination of a container, dispensing means therefor having a fixed receptacle seat and discharge nozzle so disposed that when said receptacle is seated on said seat for filling operation from said nozzle there will be no substantial tendency for tipping said container.

4. In a grease gun filler, the combination of a grease container, a pump cylinder mounted therein, a cover for said container connected to said cylinder and having a grease conducting portion terminating at one end in a centrally arranged substantially vertical discharge nozzle to which a grease gun may be connected for filling purposes, a piston in said cylinder, and means for operating said piston to cause said piston to discharge grease to the gun, the grease conducting portion of said cover having a handle by which the device may be handled.

5. In a grease gun filler, the combination of a grease container, a pump cylinder mounted therein, a cover for said container connected to said cylinder and having a grease conducting portion terminating at its upper end in a centrally arranged substantially vertical discharge nozzle and seat to which a grease gun may be connected for filling purposes, a piston operable in said cylinder for discharging grease to the gun, a rod for said piston terminating in a rack operable in the grease conducting portion of said cover, and means for actuating said rack.

Signed at Cleveland, Ohio, this ninth day of November, 1925.

CHARLES SPAETH.